(No Model.)
C. P. STEINMETZ.
REGULATION OF ALTERNATING CURRENT SYSTEMS.
No. 594,144. Patented Nov. 23, 1897.
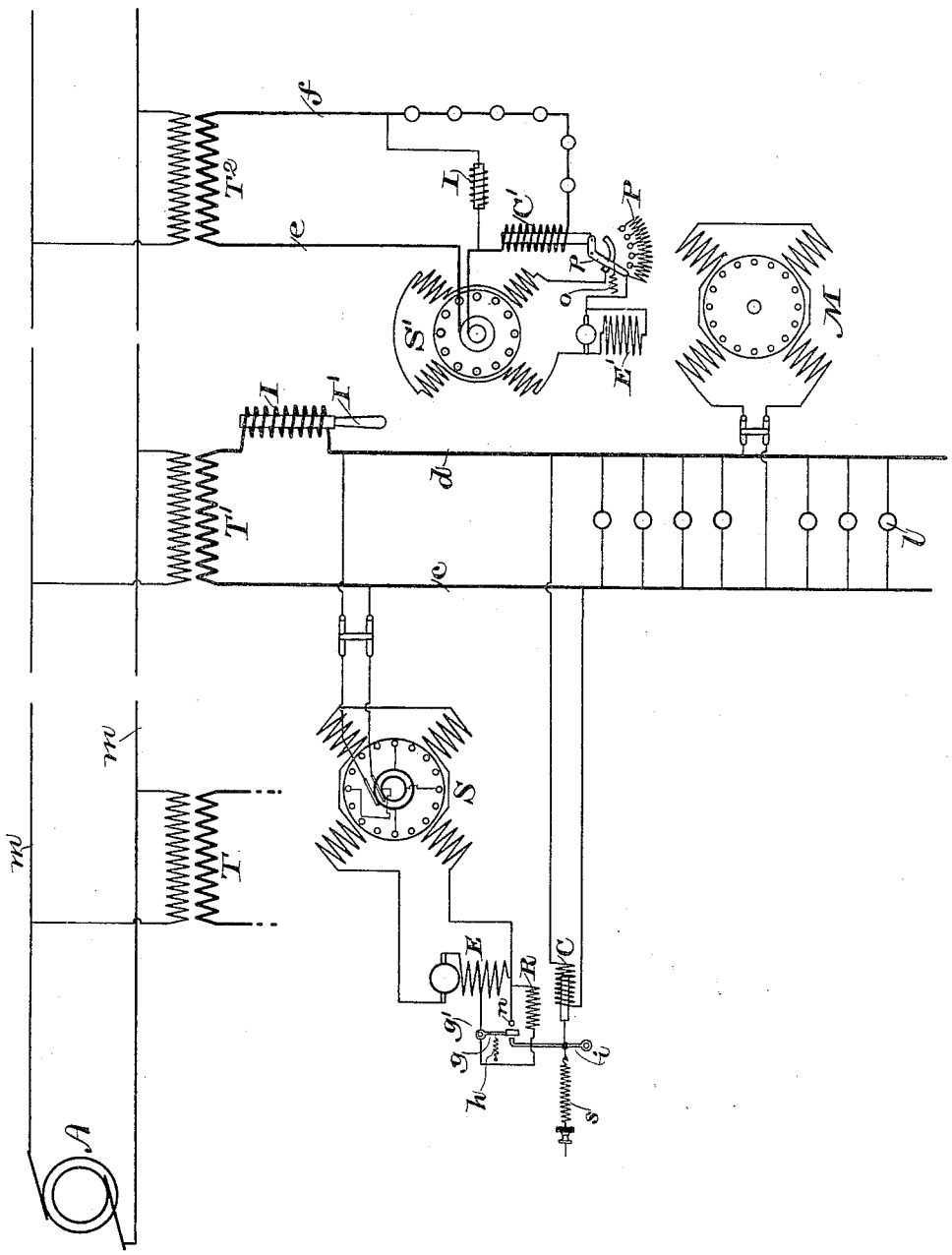

UNITED STATES PATENT OFFICE.

CHARLES P. STEINMETZ, OF LYNN, MASSACHUSETTS, ASSIGNOR TO THE GENERAL ELECTRIC COMPANY, OF NEW YORK.

REGULATION OF ALTERNATING-CURRENT SYSTEMS.

SPECIFICATION forming part of Letters Patent No. 594,144, dated November 23, 1897.

Application filed December 22, 1893. Serial No. 494,384. (No model.)

*To all whom it may concern:*

Be it known that I, CHARLES P. STEINMETZ, a subject of the Emperor of Germany, residing at Lynn, county of Essex, and State of Massachusetts, have invented a certain new and useful Improvement in Regulation of Alternating-Current Systems, of which the following is a specification.

In other applications for Letters Patent I have shown that the phase relation between current and electromotive force in an alternating-current circuit may be modified by electro-dynamic phase-modifiers resembling in general construction the synchronous machines now used for motors and other purposes by properly regulating the field strength of the phase-modifier or otherwise. I have also shown that in this manner the evil effects of self-induction in an alternating circuit may be overcome or compensated for and that constant potential or constant current may be maintained in the regulated circuit, together with other desired ends.

The present invention relates to the same subject of phase modification, and the phase-modifiers previously described are made a part of the invention in certain new combinations.

The invention comprises a system of distribution of flexible character, such that the desired potential or current conditions for proper working of the translating devices may be maintained in part of an alternating-current circuit or in the different subcircuits or working branches of such a system irrespective of changes of load and of variations of potential on the feeding-mains, or, more generically, at the source of energy supplying the circuits or portion of a circuit where regulation is needed. Regulation is effected by modifying the phase relation of current and electromotive force. Hence one important element of the invention comprises a phase-modifier capable of modifying in the necessary manner the phase relation at the point where regulation is to be secured. The phase modification may be secured by any apparatus which will cause the current or electromotive-force waves to lead or lag relatively to each other, though for practical work I recommend the synchronous machines referred to above as preferable to all other phase-modifiers now known to me.

The invention also contemplates restricting the action of the phase-modifier to such portion or portions of the system as demand regulation, for by so doing the phase control, instead of extending its influence over the entire system between the modifier and the generator, is localized, forming an effective means of regulation at the point where regulation is needed and permitting independent regulation of different portions of the same system. Hence a second element of the invention is a localizer restricting the influence of the phase-modifier and forming, as I term it, a "flexible connection" between different portions of the system, between which the potential may vary within considerable limits. The localizer may consist of any one of a number of known sources of out-of-phase waves of current or electromotive force, though I prefer to use an artificial inductance, especially on constant-potential circuits. This feature of my invention, which may be summed up as "localized phase modification" for purposes of regulation, finds a wide range of practical applications. For example, assume a long-power system supplying electrical energy to a number of substations from which extend working circuits in which the energy is utilized for lights, motors, or other purposes. In ordinary alternating systems of this character there will exist considerable differences of potential on the feeding-mains at the different stations, and the fluctuations of potential will be irregular under different conditions of load, so that any method of central-station regulation for the entire system is impracticable. By the present invention each subcircuit becomes independently regulable. The potential may rise and fall on the feeding-mains; but in spite of such variations a constant potential or constant current or any other condition may be maintained in the working subcircuits. In a similar manner, when it is desired to run motors and lights in branches from a single circuit, the fluctuations of potential due to the motors can be compensated for, and the lamps may be made to burn properly. When an artificial inductance is used as the localizer, it acts to consume or supply any difference of potential between the regulated and feeder circuits, according as the current lags behind or leads the electromotive force, and it also restricts the influence of the phase-modifier. For example, assume that the potential on the mains is too high. Then if the phase-modifier be regulated so as to cause the current to lag behind the electromotive force the self-induction due to the inductance acts in opposition to the impressed electromotive force and lowers the potential in the subcircuit, while, on the other hand, if the current is made to lead the electromotive force the self-induction will act in a contrary manner to raise the potential.

A further feature of the invention consists in rendering the desired regulation automatic by regulating the action of the phase-modifier in the above-described local circuit by a responsive device connected in the regulated circuit in such manner as to preserve automatically the desired potential or current conditions. This responsive device preferably consists of a magnet coupled in shunt or series with relation to the localized subcircuit, which by means of a motor mechanism will so control the phase-modifier as to make the current lag behind or lead the electromotive force. I do not, however, intend to limit all of my claims to this feature of the invention to the use of such an automatic regulator in a localized portion of an alternating system, since, so far as I am aware, it is entirely novel to regulate a phase-modifier on a constant-potential circuit of any character by an automatic device responding to changes of potential in the circuit.

The foregoing description outlines in a general manner the prominent features of the present invention, though it includes other features as well, which will be described hereinafter, and pointed out in the claims.

In the accompanying drawing, which illustrates the invention in diagram applied to an alternating-current distribution system, A represents a source of alternating currents, here shown as a single-phase alternator, though it is to be understood that the invention is equally applicable to all alternating systems whether single phase or multiphase. From the generator there extend feeding or supply mains $m\ m$, which ordinarily will contain no translating devices, but serve to feed alternating currents to substations where such currents will be transformed to a lower potential by converters T T' T² and supplied to subcircuits containing translating devices. One such subcircuit $c\ d$ is shown leading from the converter T', in which are coupled lamps $l$ and a motor M. Connected with the submains $c\ d$, together with these translating devices, is shown a phase-modifier S of the synchronous type, whose armature is connected in a shunt across the submains $c\ d$ and whose field or inducing member is excited by a direct current supplied from a separate exciter E. This separate exciter is series wound, and while the exciting-current so furnished may be regulated in a variety of ways I have shown for this purpose a mechanism for shunting a portion of the field-coils of the machine. This mechanism comprises a switch-arm $g$, pivoted at $g'$ and connected electrically to an intermediate portion of the field-winding of the exciter in such manner that when the arm $g$ is retracted by a spring $h$ the shunt-circuit is broken and the field strength of the exciter is at its maximum. The arm, however, may be brought into engagement with a contact $n$, so as to shunt a portion of the field-winding of the exciter when it is desired to reduce the exciting-current. To actuate the arm $g$, I have shown a pivoted lever $i$, moved in one direction by a retractile spring $s$ and in the other direction by the core of a coil C, wound as a solenoid and coupled in shunt across the submains $c\ d$. The action of this mechanism will be readily understood. When the potential in the subcircuit rises above the normal, the field strength of the exciter, and consequently the current supplied to the phase-modifier, is weakened, the reverse action taking place when the potential in the subcircuit falls below the normal, so that by intermittently making and breaking the shunt at the contact $n$ the phase-modifier is so regulated as to cause the current to lead or lag in the subcircuit according as it is desired to raise or lower the potential. A resistance R is shown shunting the contacts between arm $g$ and fixed contact $n$ to reduce the sparking at this point.

To localize the phase modification secured by the machine S, an artificial inductance similar to an ordinary reactive coil and having an adjustable magnetic core I' is coupled in series with one of the submains. Instead of this inductance other sources of out-of-phase waves of current or electromotive force may be used in combination with a suitable phase-modifier in the subcircuit. With the arrangement described the inductance restricts the action of the phase-modifier to the subcircuit $c\ d$ and, together with the phase-modifier, regulates the potential in the subcircuit in such manner as to satisfactorily compensate for any fluctuations of potential in the feeding-mains. This result is accomplished inasmuch as, the electromotive force due to the self-induction of the inductance being always ninety degrees behind the current in the subcircuit, it becomes possible by modifying the phase relation of the current and electromotive-force waves in the subcircuit to make the electromotive force due to the self-induction either assist or oppose the impressed electromotive force according as a rise or drop of potential in the subcircuit is desired. In other words, the inductance consumes any surplus of potential or supplies any deficiency of potential at the secondary terminals of the transformer other than that which is required in the subcircuit. I also make the inductance regulable in amount by providing the adjustable core I', or other equivalent manner, so that the highest degree of efficiency may be gained. If the lamps in circuit are few, the inductance should be made considerable, while if the number of lamps is increased the amount of inductance may be diminished. With this arrangement a constant potential in the local circuit can be maintained. Indeed it may not be necessary in all cases to regulate the phase-modifier S, since a small drop of potential in the circuit will alter the relation between the counter electromotive force developed in the machine and the impressed electromotive force, so that a larger leading current will flow in the machine, which will tend to raise the local potential, and in like manner a small increase of the local potential causes a larger lagging current to flow in the machine, tending to keep the local potential down. It is also obvious that the self-induction of the transformer will to a certain extent supplement the inductance I, and in some cases the self-induction of the transformer may intentionally be made large enough so as to make a special inductance unnecessary. The inductance I can be placed in either the primary or secondary branches of the transformer, or, in fact, at any point between the phase-modifier and the feeding-mains.

At the right of the drawing is shown a second subcircuit connected with the feeding-mains through a transformer T². In this subcircuit $e\ f$ are shown translating devices in series, so that a constant current in the subcircuit is desirable. In this case I may couple the armature of the synchronous machine S' in series with the load, while the inductance I shunts the load. To excite the field of the synchronous machine, there is provided a separate direct-current generator E', which is regulated automatically in response to changes of current by a coil C' in series with the lamps. The exciter may be regulated in a number of ways, many of which are well known. I show for this purpose a resistance P in the external circuit of the machine, more or less of which is brought into circuit to regulate the current exciting the field of machine S' by a contact-arm $p$, the arm being moved in one direction by a spring $o$ and in the other by the core of the coil C'. If the current in the subcircuit becomes too small, resistance is cut out of circuit, thereby strengthening the field of the synchronous machine, while if the current in the subcircuit rises above the normal a reverse action takes place. In this way a constant current will be preserved in the circuit at all times.

What I claim as new, and desire to secure by Letters Patent, is—

1. The combination in an alternating-current system, of a source of out-of-phase waves of current or electromotive force between the feeding-mains and a working subcircuit or branch of the system, and a phase-modifier in such subcircuit.

2. The combination in an alternating-current system, of a regulable phase-modifier in a subcircuit or branch of the system, and a localizer restricting the influence of the phase-modifier from other portions of the system, as set forth.

3. The combination in an alternating-current system, of a phase-modifier in a working subcircuit or branch of the system, and an inductance localizing the action of such phase-modifier, as set forth.

4. The combination in an alternating-current system, of a source of out-of-phase waves of current or electromotive force between the mains and a subcircuit of the system, with a phase-modifier in such subcircuit and a regulator therefor such that the current in such subcircuit may be caused to lead or lag behind the electromotive force.

5. The combination in an alternating-current system, of a source of out-of-phase waves of current or electromotive force between the mains and a subcircuit of the system, with an electrodynamic phase-modifier comprising a conductor movable relatively to a magnetic field, and means for regulating the phase-modifier, as set forth.

6. The combination in an alternating-current system, of an inductance for localizing a subcircuit or portion of such system, and an electrodynamic phase-modifier comprising a conductor movable relatively to a magnetic field for modifying the relation of current and electromotive force in such regulated portion of the system and means for regulating the phase-modifier so as to cause the current to lead or lag, as set forth.

7. The combination in an alternating-current system, of an electrodynamic phase-modifier of the synchronous type regulable for modifying the phase relation as desired in a subcircuit or portion of the system, and an inductance serving as a localizer for restricting the influence of the phase-modifier, as set forth.

8. The combination in an alternating-current system, of a phase-modifier and an artificial inductance for localizing the influence of the phase-modifier to a subcircuit or portion of the system requiring regulation, one connected in series and the other in shunt with the load, as set forth.

9. The combination in an alternating-current system, of a phase-modifier and a source of out-of-phase waves of current or electromotive force acting as a localizer to restrict the influence of the phase-modifier, and means for regulating the localizer, as set forth.

10. The combination in an alternating-current system, of an artificial inductance between the feeding-mains and a subcircuit or regulated portion of the system, with means for regulating the inductance and a phase-modifier in the subcircuit, as set forth.

11. The combination in an alternating-current system, of an artificial inductance and a phase-modifier of such character as to cause the current to lead the electromotive force.

12. The combination in an alternating-current system, of an artificial inductance, a phase-modifier and means for regulating the phase-modifier so as to cause the current to lag or lead as desired.

13. The combination in an alternating-current system, of an artificial inductance in series with the load on a subcircuit of the system with an electrodynamic phase-controller of the synchronous type in shunt to the load on such circuit, and means for regulating the counter electromotive force of such phase-modifier with relation to the impressed electromotive force, as described.

14. The combination with the mains of an alternating system, of an inductance between said mains and the translating devices, and a phase-modifier controlling the relation of current and electromotive force in said devices.

15. The combination with the mains of an alternating system, of an inductance between said mains and the translating devices, and a regulable phase-modifier controlling the relation of the current and electromotive force in said devices.

16. The combination with the mains of an alternating system, of an inductance between said mains and the translating devices, and an automatically-regulable phase-modifier controlling the relation of current and electromotive force in the said devices.

17. The combination in an alternating-current system, of a phase-modifier and localizer acting respectively to modify the phase relation of current and electromotive force in a subcircuit or portion of the system, and to restrict the phase modification from other parts of the system, and an automatic regulator for the phase-modifier maintaining the desired potential or current conditions, as set forth.

18. The method of regulating an alternating-current-distribution system which consists in modifying the phase relation between current and electromotive force in a subcircuit or portion of such system requiring regulation, and localizing the influence of such phase modification from other portions of the system, as set forth.

19. In an alternating-current system, the method of regulation which consists in localizing a sub circuit or circuits from the feeding-mains by a source of out-of-phase waves of current or electromotive force, and modifying the phase relation in such sub circuit or circuits in such manner as to maintain the desired potential or current conditions, as set forth.

20. The method of regulation for an alternating-current system which consists in providing an inductance in a subcircuit or portion of the system requiring regulation, and modifying the phase relation of current and electromotive force in such subcircuit, as set forth.

21. The method of localizing or rendering independent two or more subcircuits or portions of an alternating system, supplied from common mains, which consists in adjusting to different conditions, the self-induction and the displacement of phase of electromotive force and current in such different portions.

22. The method of localizing a subcircuit supplied from alternating mains, which consists in adjusting the relative value of the self-induction and of displacement of phase of electromotive force and current in such portions to give the desired relation between the subcircuit and the mains.

23. The combination with alternating mains of two or more subcircuits supplied from such mains, regulable artificial inductances in said subcircuit and phase-modifiers connected with such subcircuits controlling the relative phase of electromotive force and current in such subcircuits.

24. The combination with alternating mains of two or more subcircuits supplied therefrom, regulable artificial inductances in said subcircuits and regulable phase-modifiers connected with such subcircuits and controlling the relative phase of electromotive force and current in said subcircuits.

25. The combination with alternating mains of a subcircuit supplied therefrom and a regulable artificial inductance in said circuit and a phase-modifier controlling the relative phase of current and electromotive force in said subcircuit.

26. The combination with alternating-current mains of a subcircuit supplied from such mains and an artificial inductance in such said circuit and a phase-controller connected with such subcircuit and controlling the relative phase of current and electromotive force in the subcircuit.

27. The combination in an alternating-current system, of an electrodynamic phase-modifier comprising a conductor movable relatively to a magnetic field, and an automatic regulator therefor responsive to changes of potential in the circuit.

28. The combination in an alternating-current circuit, of a phase-modifier consisting of a dynamo-electric machine of the synchronous type, and a regulator responsive to changes of potential in the circuit for varying the counter electromotive force developed in the machine with relation to the impressed electromotive force.

In testimony whereof I have hereto set my hand this 20th day of December, 1893.

CHARLES P. STEINMETZ.

Witnesses:
JOHN W. GIBBONEY,
BENJAMIN B. HULL.